United States Patent [19]

Jego et al.

[11] Patent Number: 4,823,231

[45] Date of Patent: Apr. 18, 1989

[54] CURRENT TAPPING DEVICE DISCONNECTABLE FROM AN OMNIBUS BAR DISTRIBUTION COLUMN

[75] Inventors: Gérard Jego, Brazey en Plaine; Guy Lacan, le Mesnil le Roi Maisons Laffitte; Jean-Pierre Thierry, Couternon; Serge Verdenne, Marcilly sur Tille, all of France

[73] Assignee: La Telemecanique Electrique, France

[21] Appl. No.: 6,828

[22] Filed: Jan. 22, 1987

[30] Foreign Application Priority Data

Jan. 22, 1986 [FR] France .................. 86 00842

[51] Int. Cl.$^4$ ............................................. H02B 1/20
[52] U.S. Cl. .................................... 361/331; 361/338; 361/341; 361/355; 439/207; 439/833; 200/50 AA
[58] Field of Search ............... 361/331, 338, 339, 341, 361/342, 355; 200/50 AA

[56] References Cited

U.S. PATENT DOCUMENTS 4,668,035  5/1987  Jego et al. ........................ 361/341

Primary Examiner—Robert S. Macon
Attorney, Agent, or Firm—William A. Drucker

[57] ABSTRACT

A disconnectable current tapping device is provided having clips engageable on onmibus bars and disengageable therefrom by translation of a clip carrying slide controlled by a rotary shaft, which is rotated by a plug which is mounted for translation on the shaft while being urged by a return spring, and which is subjected to the action of a control member such as an operating key. By an axial thrust exerted on the plug, a transmission piece provided with a spur in engagement in an annular groove formed in the plug, is drawn in translation so as to actuate a prebreak microcontact; at the end of rotation of the shaft controlling the disconnection, the piece is retained by a resilient retractable member, whereas the plug is returned only through a ramp provided at the edge of the groove so as to allow release of the spur.

11 Claims, 12 Drawing Sheets

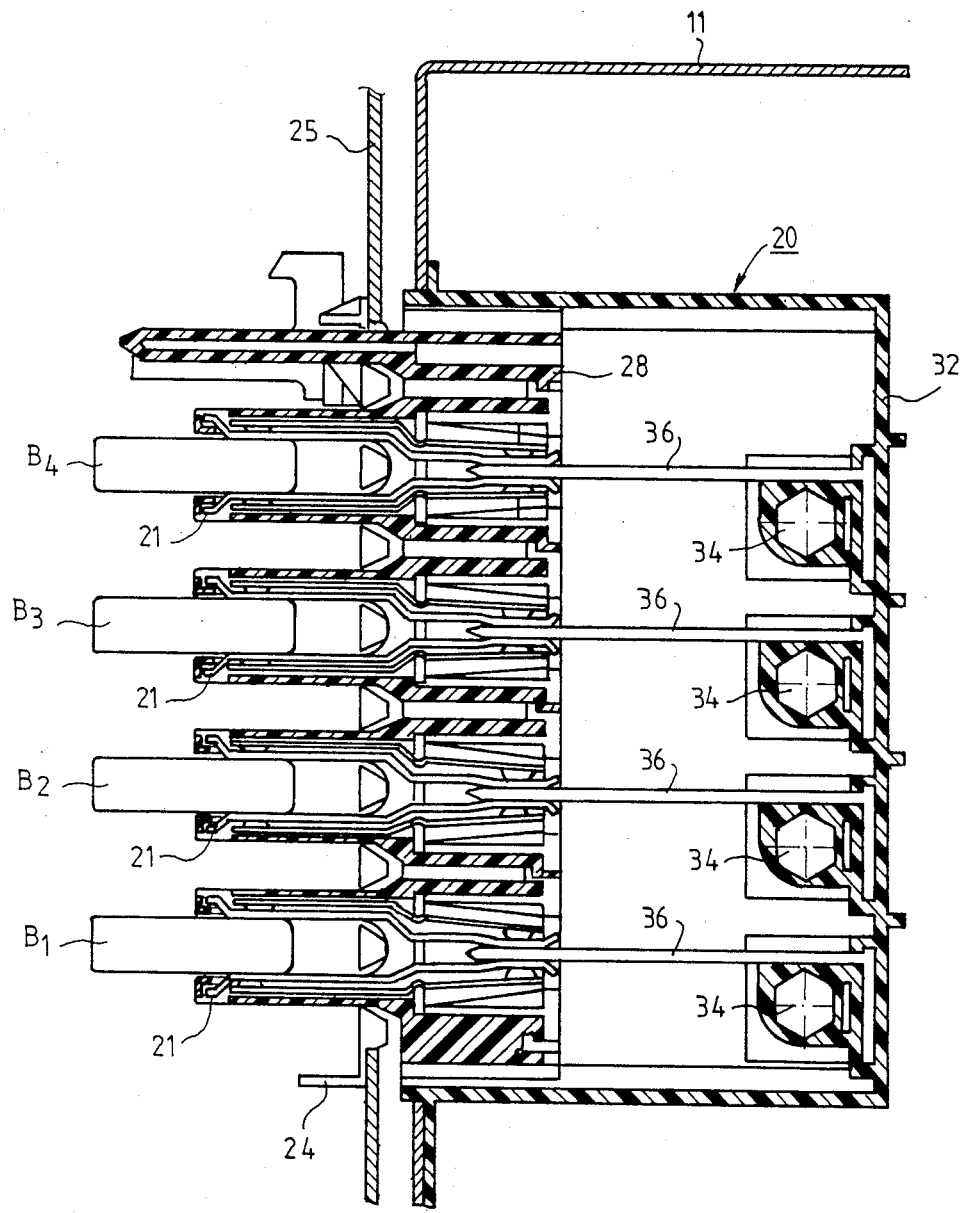

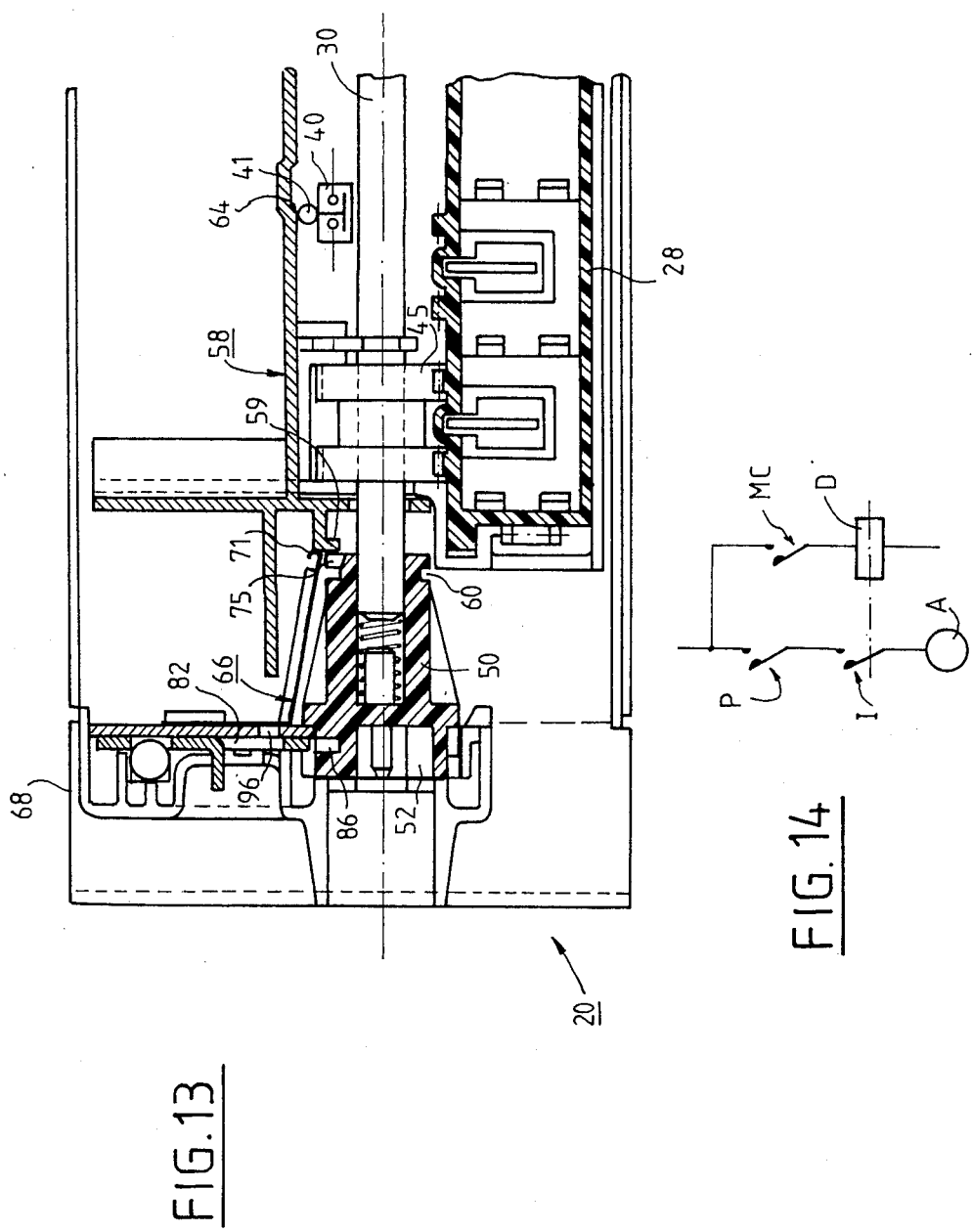

CURRENT TAPPING DEVICE DISCONNECTABLE FROM AN OMNIBUS BAR DISTRIBUTION COLUMN

BACKGROUND OF THE INVENTION

1. Field of the Invention

The present invention relates to a disconnectable current tapping device on a distribution column having parallel non coplanar omnibus bars, for electrical switching apparatus.

By electrical switching apparatus is meant in the present context apparatus such as contactors, circuit breakers, circuit breaker contacters, protection apparatus or switches properly speaking having several poles for providing opening and/or closure of a power circuit fed from the above mentioned distribution omnibus bars.

2. Description of the Prior Art

From the French patent application No. 84 19536 filed on the Dec. 20th, 1984 in the name of the applicant, for "A DISTRIBUTION SYSTEM AND COLUMN FOR ELECTRICAL SWITCHING APPARATUS", and published under the No. 2 575 340, a current tapping and disconnection device is known associated with a distribution column including vertical non coplanar omnibus bars oriented in different vertical parallel planes. This device is in the form of a block molded from an insulating material and has, on the one hand, fixed means for electrical connection to power terminals of the switching apparatus used and, on the other hand, current tapping clips engageable on the vertical omnibus bars and disengageable therefrom by translation of a clip carrying slide controlled by a rotary shaft, which is rotated by a plug which is mounted for translation on the shaft while being urged by a return spring and which is governed by a manual control member.

In the above mentioned application, the current tapping (engagement) and disconnection block also includes a pre-break microcontact which is sensitive to the movement of the plug along the axis of the shaft during actuation of the manual control member, and which causes tripping of the switch apparatus during movement of the plug, so as to ensure that disconnection will take place off load.

SUMMARY OF THE INVENTION

The purpose of the present invention is in particular to improve this type of disconnectable current tapping device, by providing in appropriate cooperation with the above mentioned disconnection control means, a simple safety device which causes the pre-break before the disconnection movement.

It also aims at providing a device in which the means controlling the disconnection are particularly well adapted so as to allow the operator to disconnect and to reset in all safety the electric connection between the distribution omnibus bars and the switch apparatus.

According to the invention, in a disconnectable current tapping device of the above described type, means controlling the pre-break include a transmission piece movable in translation while being urged by another return spring and having a ramp driving a member actuating the microcontact, the transmission piece occupying, in the engagement position, a first rest position in which the switch apparatus is engaged, and the transmission piece also includes a spur in the form of a hook coming into engagement, for the engaged position, in an annular groove formed in the external periphery of the plug at one of its ends so as to allow, in this engagement position, the translational movement both of the plug along the axis of the shaft under the action of a pressure force exerted thereon by the manual control member and of the transmission piece from its position of rest whose ramp, during this movement, urges the member actuating the microcontact so as to cause tripping of the switch apparatus, control of the disconnection by rotation of the shaft taking place at the end of the movement of the plug-transmission piece assembly and by maintaining the pressure force, the spur being in sliding abutment in the groove of the plug during disconnection control.

According to another characteristic of the invention flexible retractable means formed for example by a blade spring are provided for retaining, solely in the disconnection position, the transmission piece previously moved so as to allow through a disengagement ramp formed at the edge of the groove of the plug and coming opposite the spur of the transmission piece in the disconnection position, the movement in the reverse direction of the plug alone under the action of its spring after release of the pressure force.

According to another aspect of the invention, the plug driving the rotary shaft is provided on its surface with a notch in which, solely in the disconnection position, a manually actuated sliding flap is engaged, said flap once engaged in the notch of the plug leaving uncovered a window so as to allow, in this disconnection position, locking of the "three padlock" type of the device; in addition, the flap is able to be locked in the engagement position in which it completely closes said window.

Preferably, the disconnection control member is formed by a key having a spur and having an asymmetrical imprint intended to be received in a mating housing of the plug solely in the two respective engagement and disconnection positions, through two registered passage notches for the spur which are formed in a piece forming an insertion collar coaxial with the plug and which coincide with the housing of the plug only in the two respective engagement and disconnection positions.

Means may further be provided for displaying the effective break, formed simply by a window in which the ends of the clips appear in the disconnection position.

BRIEF DESCRIPTION OF THE DRAWINGS

Other features and advantages of the invention will be clearer from the detailed description which follows with reference to the accompanying drawings given solely by way of examples and in which:

FIG. 2 shows a partial top view in section of the distribution column associated with the disconnectable current tapping device of the invention, this latter being shown in the position engaged on the column;

FIGS. 7, 9, 11 and 13 show a partial sectional view along line V—V of FIG. 3, respectively for different positions assumed by the device of the invention during a disconnection control;

FIGS. 8, 10, 12 and 14 show a simplified diagram in the form of electric contacts whose respective illustrated states correspond respectively to the different position of the device of the preceding Figures;

DESCRIPTION OF THE PREFERRED EMBODIMENTS

Figure 1:
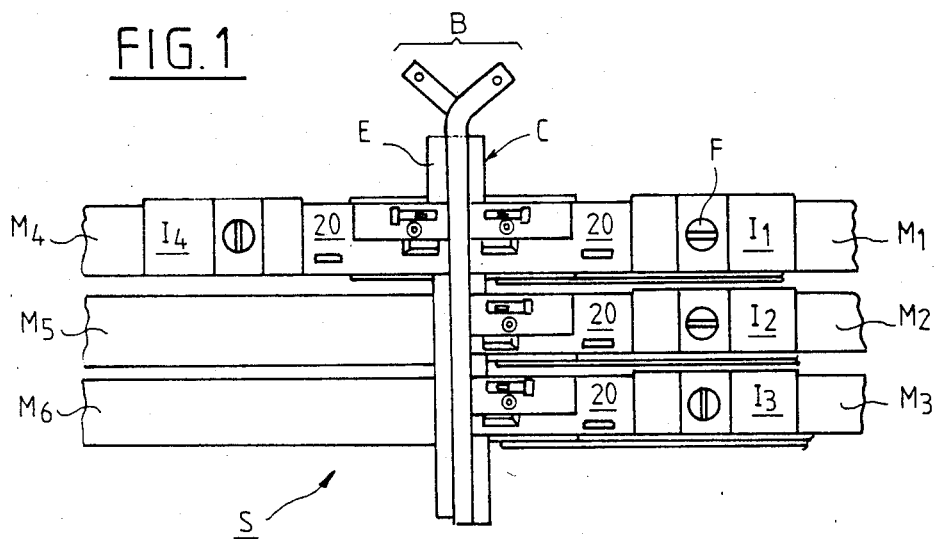
FIG. 1 shows in front elevation an electric distribution system for switch apparatus.

In FIG. 1 is shown a system S for distributing electric current from a column C which includes a set of vertical non coplanar omnibus bars B situated in different vertical parallel planes and a protective casing E disposed about the bars.

The arrangement of the omnibus bars of the column referenced $B_1$-$B_4$ can be better seen in FIG. 2; they are for example four in number and correspond in this case to the conductors of a three phase electric network with neutral; of course, the bars B may be in a greater or smaller number.

The distribution system illustrated in FIG. 1 is designed for fixing and electrically connecting switching apparatus, such for example as contactors, circuit breakers, circuit breaker contacters or switches properly speaking, with which are possibly associated auxiliary devices not shown such as protective devices, fuses, remote control devices. For this, the system S of FIG. 1 is formed of several supports forming modules $M_1$-$M_6$ which extend in a direction parallel to the planes of the bars and which are disposed for example bilaterally with respect to column C on the opposite vertical sides thereof.

Each support or module includes a fixed part 11 shown in FIG. 2 which is applied by any appropriate means to one of the sides of the casing protecting the set of bars, and a plate adjustable in depth, that is to say perpendicular to the planes of the bars, with respect to the fixed part.

As can be clearly seen in FIG. 1, each of the four supports $M_1$ to $M_4$ supports, on the one hand, a switching apparatus respectively $I_1$ to $I_4$ equipped for example with a manual control button or lever symbolized at F and, on the other hand, a disconnectable current tapping member designated generally by the reference 20 and arranged between the side of the protective casing of the set of bars and the associated switching apparatus.

It will be noted that the system shown may be installed independently or in a housing formed for example by a cabinet.

In a preferred embodiment illustrated in FIG. 2, the disconnectable current tapping member 20 is a block molded from an insulating material, of a generally substantially parallelepipedic shape, which is secured to the fixed part 11 of the corresponding module by fixing means and which is provided with current tapping clips 21 engageable on the distribution bars $B_1$-$B_4$ by introduction in a trap 24 provided in the corresponding side 25 of the housing perpendicular to the planes of the bars.

Clips 21 are permanently housed in adjacent through cavities formed in a slide 28 made from an insulating material and they are disengageable from the omnibus bars $B_1$-$B_4$ by translation of slide 28 in a direction parallel to the planes of the bars, which slide is controlled by a fixed rotary shaft 30 (FIG. 3) whose axis extends in the direction perpendicular to the direction of movement of the slide.

Block 20, FIG. 2, also has a fixed part 32 which supports, on the one hand, the rotary shaft controlling the slide and on the other, fixed means for electric connection for example by means of screws 34 with power terminals of the associated switch apparatus; each connection terminal 34 is connected electrically to the associated clip 21, preferably by means of a conducting knife 36 fixed at one of its ends in the terminal 34 and clamped at its other end between the two contacts of clip 21.

Figure 3:
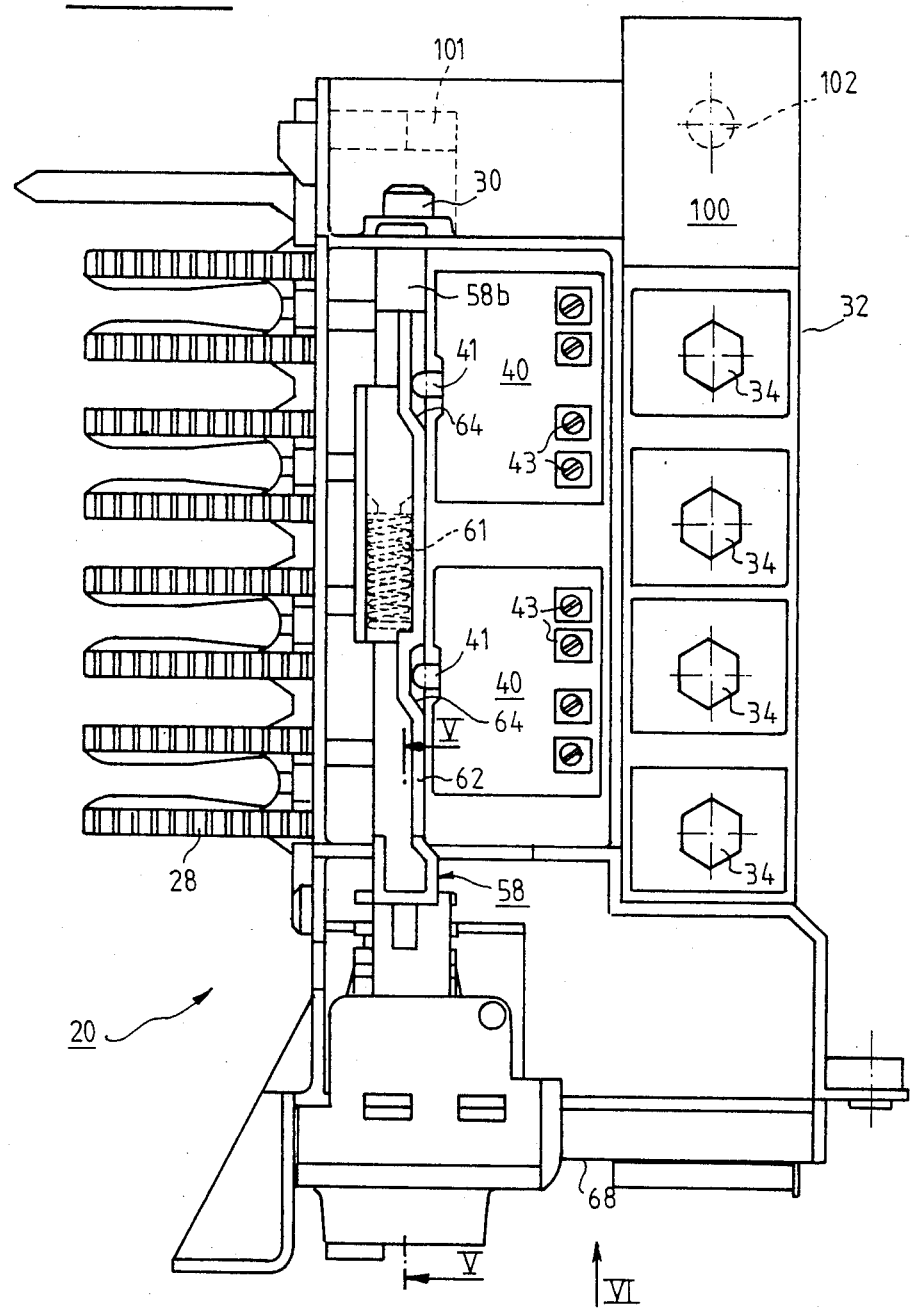
FIG. 3 shows a schematical top view of the disconnectable current tapping device of the invention.

As is shown in FIG. 3, the current tapping and disconnection block 20 includes two identical pre-break microcontacts, known per se and designated generally by the reference 40, which are each housed in a case mounted on the fixed part 32 of the block by fixing means. Each microcontact 40 is adapted to be actuated by a retractable finger 41 and has means for electric connection for example by means of screws 43 with control terminals of the associated switch apparatus, tripping of this latter occurring in response to the actuation of the microcontact. It should be noted that block 20 may have only a single pre-break microcontact instead of two as in the example shown, without for all that departing from the spirit of the invention.

As will be seen in detail further on, the pre-break microcontact forms in itself an electric safety device for the power circuit, in that actuation thereof causes switching off of the circuit before disconnection.

Figure 4:
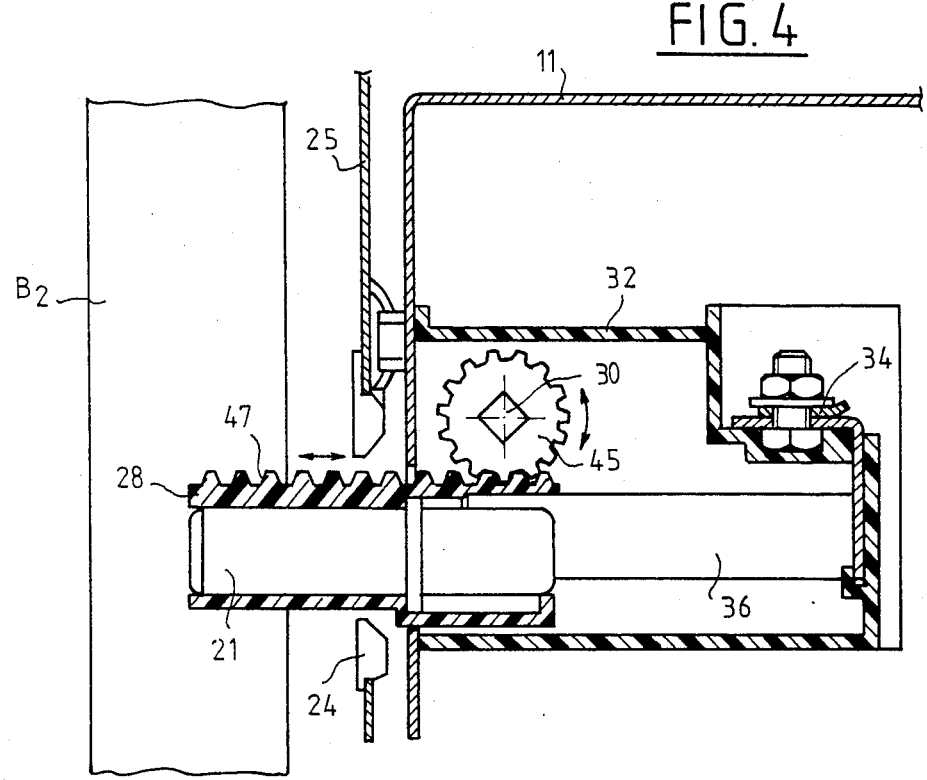
FIG. 4 shows a partial sectional view of a rack and pinion connection between the rotary shaft controlling the disconnection and the slide carrying the electric connection clips.

FIG. 4 shows one example of a type of movement transformation connection, with rack and pinion, which is used for causing the translational movement of the clip carrying slide in response to rotation of the control shaft. Thus, in FIG. 4, at 45 has been shown the pinion which is mounted on the rotary shaft 30, this latter having for example a square cross section, and which meshes with the rack 47 formed on the upper face of the slide in a direction parallel to the planes of the omnibus bars; clip 21 is shown in FIG. 4 in the engaged position on one of the omnibus bars, for example on that referenced $B_2$.

Figure 6:
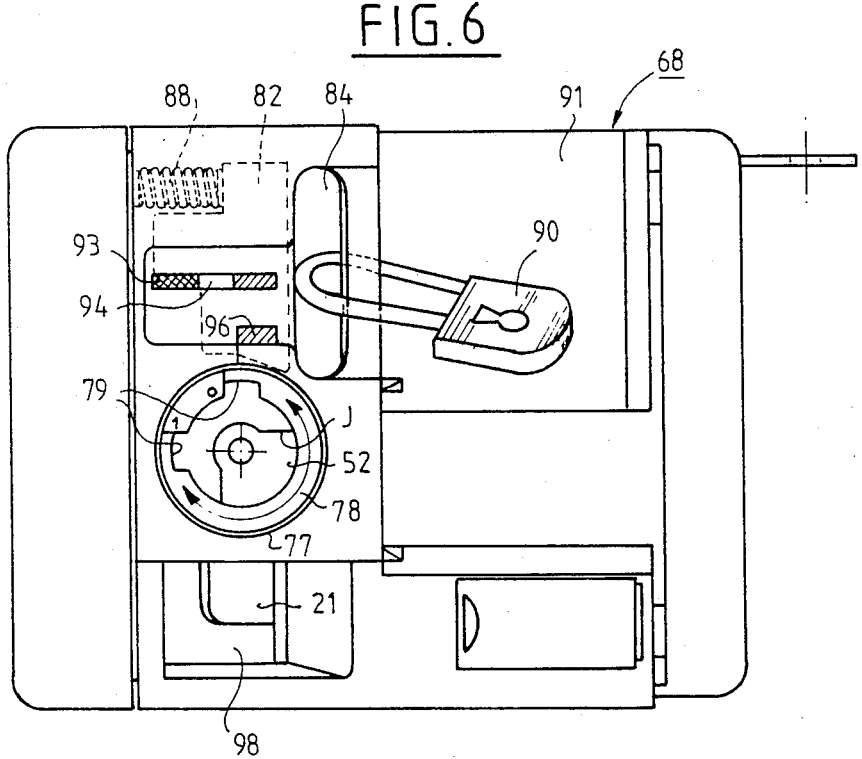
FIG. 6 shows a view along arrow VI of FIG. 3, the device of the invention being illustrated in the disconnected position and after padlocking.
Figure 5:
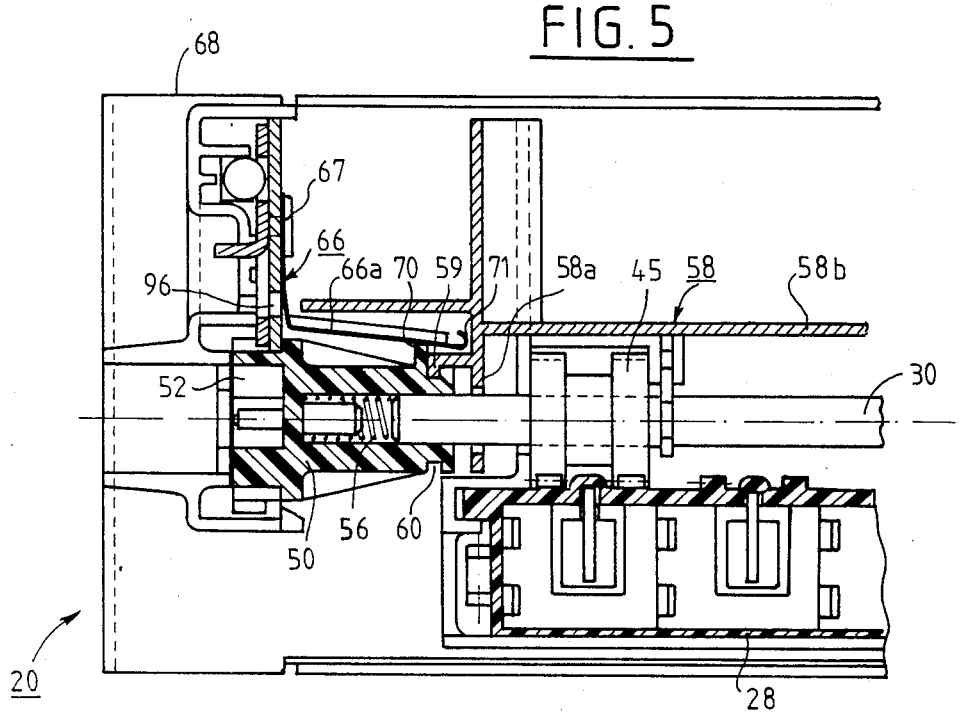
FIG. 5 shows a partial sectional view along line V—V of FIG. 3.

In FIG. 5 there is shown at 50 a plug for rotating shaft 30 which is mounted on this latter on the front face thereof and which is provided on the rear face with an appropriate housing 52 intended to receive matingly a manual control member such for example as an operating key 54 (FIGS. 7, 11); the key has an asymmetrical imprint of the same profile as the one illustrated at J in FIG. 6 for its mating housing 52. The plug 50, see FIG. 5, may also be guided axially on shaft 30 while being urged in a conventional way by a return spring 56, so as to be capable of a slight axial rearwards travel with respect to the shaft (plug driven in) under the action of a pressure force exerted by the key during introduction thereof into the housing 52; the plug is returned after release of the pressure force.

It will be noted that the control member actuating the plug may be of a type other than manual, such for example of the electric, pneumatic or hydraulic type, without departing from the scope of the invention.

According to one feature of the invention, the disconnectable current tapping block 20, shown in FIGS. 3 and 5, includes a transmission piece designated generally by the reference 58 for controlling the two pre-break microcontacts 40 (FIG. 3) before disconnection. This transmission piece 5 has a general substantially L shape whose vertical leg 58a (FIG. 5) ends in two lugs which are clipped, with a slight play, about shaft 30 and whose horizontal leg 58b parallel to the axis of the shaft is mounted, with a slight play, in a bearing provided in the block.

As is shown in FIG. 5, the vertical leg 58a supports at right angles a spur in the form of a hook 59 whose nose is intended to be engaged in an annular groove 60 formed in the plug 50 on its front face side, so as to interlock the transmission piece 58 with the plug 50. Thus, in this arrangement, plug 50 drives piece 58 in translation rearwardly with respect to shaft 30 under the action of a pressure force exerted by the key during engagement thereof in the housing 52; during its rearward movement, piece 58 urges a spring 61 shown with broken lines in FIG. 3.

The horizontal leg 58b of the transmission piece has, substantially over the whole of its length, a vertical wall 62 visible in the top view of FIG. 3, against which abut the two retractable fingers 41 actuating the two respective microcontacts 40. This wall 62 has, over the whole of its height, two indentations provided with respective ramps 64 of the same slant which are disposed so as to drive respectively the two fingers 41 during the rearward movement of the transmission piece, so that the fingers thus urged cause the simultaneous actuation of the two pre-break microcontacts 40.

It will be noted that the transmission piece with its hook 59 and its vertical indented wall 62 is advantageously integrally molded from an insulating material.

The disconnectable current tapping block, in accordance with the invention, also has flexible means which are capable, on the one hand, of occupying a retracted position not only during the pre-break by translation of the transmission piece 58 but also during a large part of the disconnection movement by rotation of shaft 30 chosen for example as three quarters of a revolution and, on the other hand, of retaining the transmission piece 58 at the end of the disconnecting movement in its position assumed after translation.

In FIG. 5, these flexible retractable retainer means are formed for example by a blade spring 66 bent almost at right angles and fixed at one of its ends 67 to an insulating plate 68 fixed by clipping for example on the front face of the disconnection block 20 (FIG. 3). Retraction of spring 66 is provided by means of a cam in the form of an arc of a circle 70 provided on the surface of plug 50, in the vicinity of the groove 60 thereof, and cooperating in abutment with the slanted leg 66a of the spring during the pre-break by translation and disconnection by rotation through three quarters of a revolution, cam 70 being adapted so as to retract from leg 66a towards the end of the disconnection movement; the free end 71 of spring 66 is slightly curved so as to form a stop cooperating, following retraction of the cam, with the spur 59 of the transmission piece 58 at the end of the disconnection movement.

Figure 11:
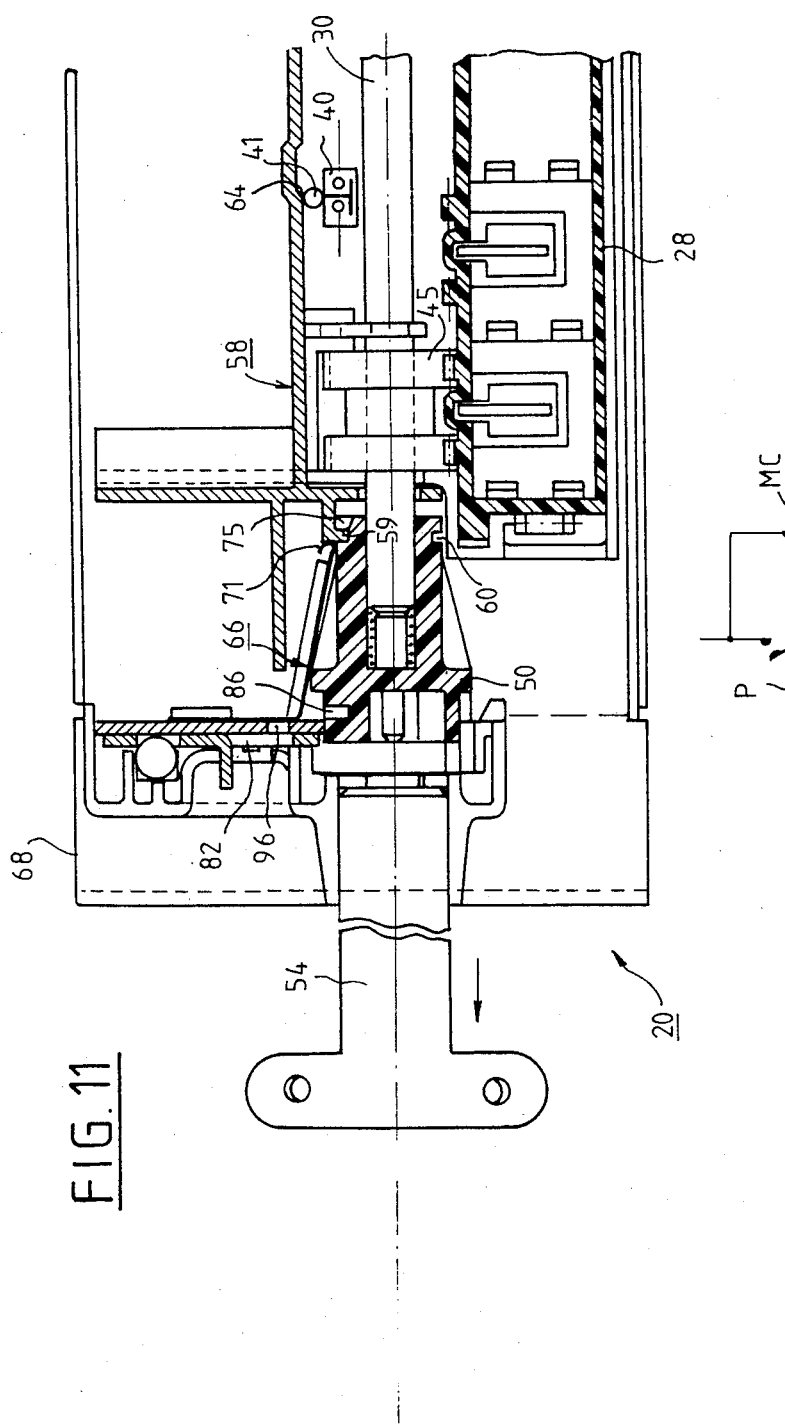
Figure 12:
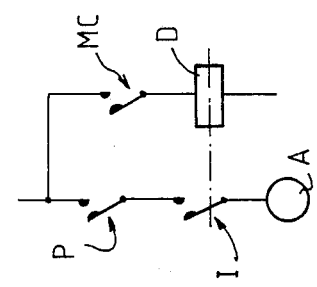

The annular groove 60 of plug 50 is provided with a disengagement ramp referenced at 75 in FIG. 11, which opens outwardly on the front face of the plug; this ramp 75 is situated on the plug so as to come opposite the spur 59 of the transmission piece 58 at the end of the disconnection movement by rotation, through three quarters of a revolution in the example chosen, of shaft 30. Thus, in the disconnection position, plug 50 is able to be returned alone (forwards with respect to the shaft) during removal of the operating key, by being separated from the transmission piece 58 when spur 59 passes over the ramp 75, which piece 58 is retained by its spur in abutment against the end 71 of the blade spring 66.

FIG. 6 shows the front face of the insulating plate 68 which is fixed on the front face of the disconnectable current tapping block 20 (FIG. 3). This plate 68, FIG. 6, has a projecting tubular part 77 disposed coaxially with the plug for allowing introduction of the key in the mating housing 52. This tubular part 77 is provided on its front face with an annular facet 78 able to form a stop and having two notches 79 for the insertion and removal of the key controlling disconnection and resetting, through a mating spur (not shown) carried by the key. These two notches 79 are further positioned angularly with respect to each other, without being symmetrical, at an angle of rotation chosen for the movement controlling the disconnection (or re-engagement), that is to say 270° in the example shown previously. The asymmetrical shape of the key and the arrangement of the two notches 79 mean then that the key can only be engaged and withdrawn in the two positions "disconnected" (shown by the indication "0") and "reset" (shown by the indication "1") by rotating through three quarters of a revolution so as to pass from one to the other while preventing in particular the key from being withdrawn in its intermediate position.

Plate 68 has on its rear face a vertical metal flap 82 forming a bolt, shown with broken lines in FIG. 6, which is shaped and placed so as to be blocked by abutment against plug 50 in the engaged position; in this position, flap 82 closes an oblong vertical window 84 formed in the plate. Plug 50 is provided close to its rear end with an engagement notch shown at 86 in FIG. 11, which is in the form of an arc of a circle subtended by an open flat bottom on one side, and which is situated so as to come into the lateral extension of flap 82 at the end of the disconnecting movement after removal of the key. Thus, in the disconnection position, flap 82 once released may be moved by engagement by lateral sliding in the notch and by urging a spring 88; notch 86 is formed in plug 50 so that at the end of travel flap 82 comes into abutment against the bottom of the notch and leaves the aperture 84 completely uncovered so as to allow locking of the "3 padlock" type of the block. In FIG. 6, at 90 is illustrated a padlock introduced into the aperture 84 and housed in an appropriate recess 91 provided in the plate, after movement from right to left of the flap. It should be noted that flap 82 is dimensioned so as to bear against the padlock once introduced while ensuring immobilization of the plug by engagement thereof in notch 86.

Flap 82 may be moved manually for example by means of a pull tab member 93 (FIG. 6) which is formed integrally with the flap while projecting from a rectangular guide opening 94 formed in the plate 68, and which is able to move in this opening 94 in the same direction as the flap 82, this latter being returnable under the effect of the spring 88.

Plate 68 also has an access orifice 96 placed opposite the vertical leg of the blade spring 66 as is shown in FIG. 5, and intended, in the "disconnected" but "not padlocked" position, for the introduction of a tool actuating the spring for an "off load operation" of the switch apparatus. It will be noted that in the "disconnected - padlocked" position, as shown in FIG. 6, flap 82 closes orifice 96, thus providing complete locking of the block.

At the bottom left of the front face of the plate 68 of FIG. 6, can be seen a window 98 so that the operator can check the effective break by the appearance of the end of clips 21 in this window in the disconnected position.

The disconnected state of block 20 may also be indicated by an indicator light (not shown) lighting up in response to the actuation of a conventional microcontact fixed to the block and shown at 100 in FIG. 3; the slide 28 has projecting from one of its edges a ramp shaped cam shown schematically by the broken line 101 in FIG. 3, which drives a finger 102 actuating the microcontact during disengagement of the clips by translation of the slide.

The way of effecting a disconnection operation will now be explained with reference to FIGS. 7 to 16.

Figure 7:
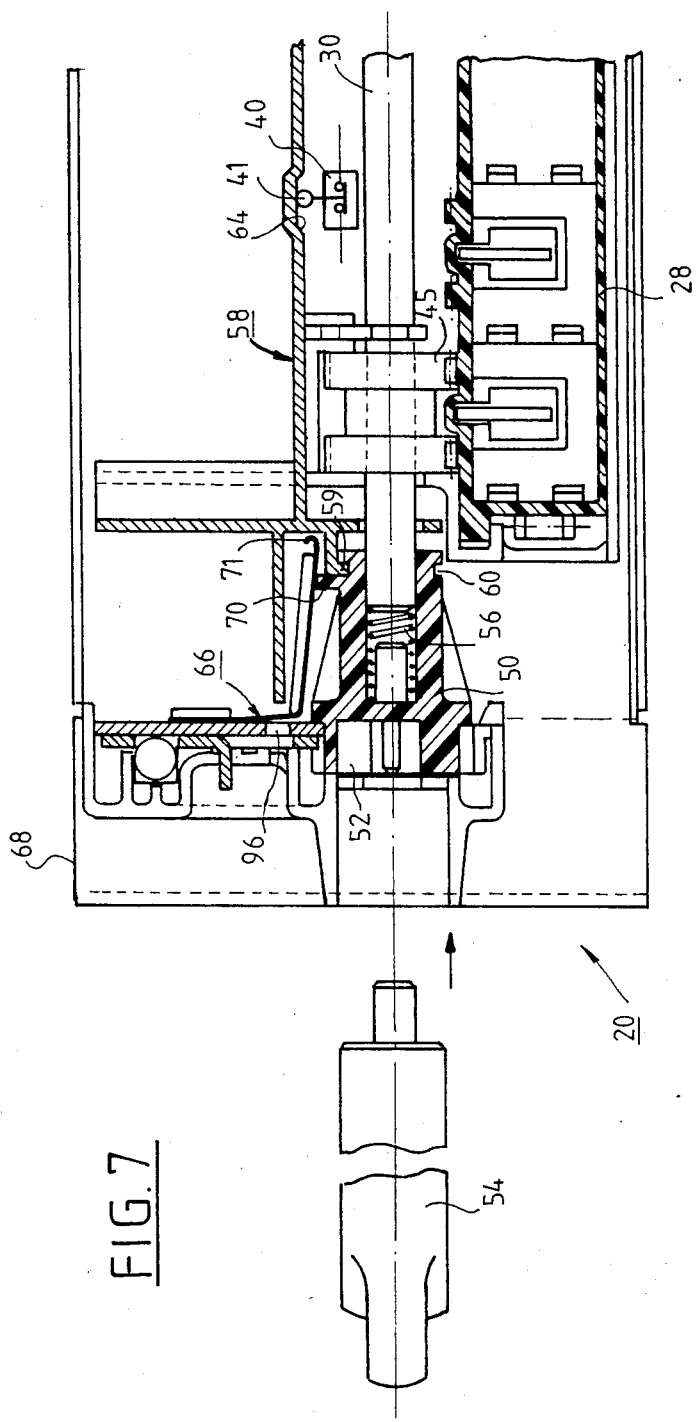
Figure 8:
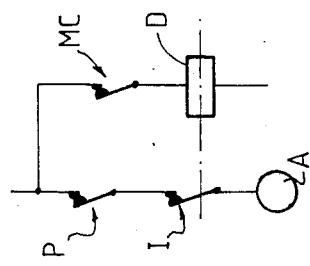
Figure 9:
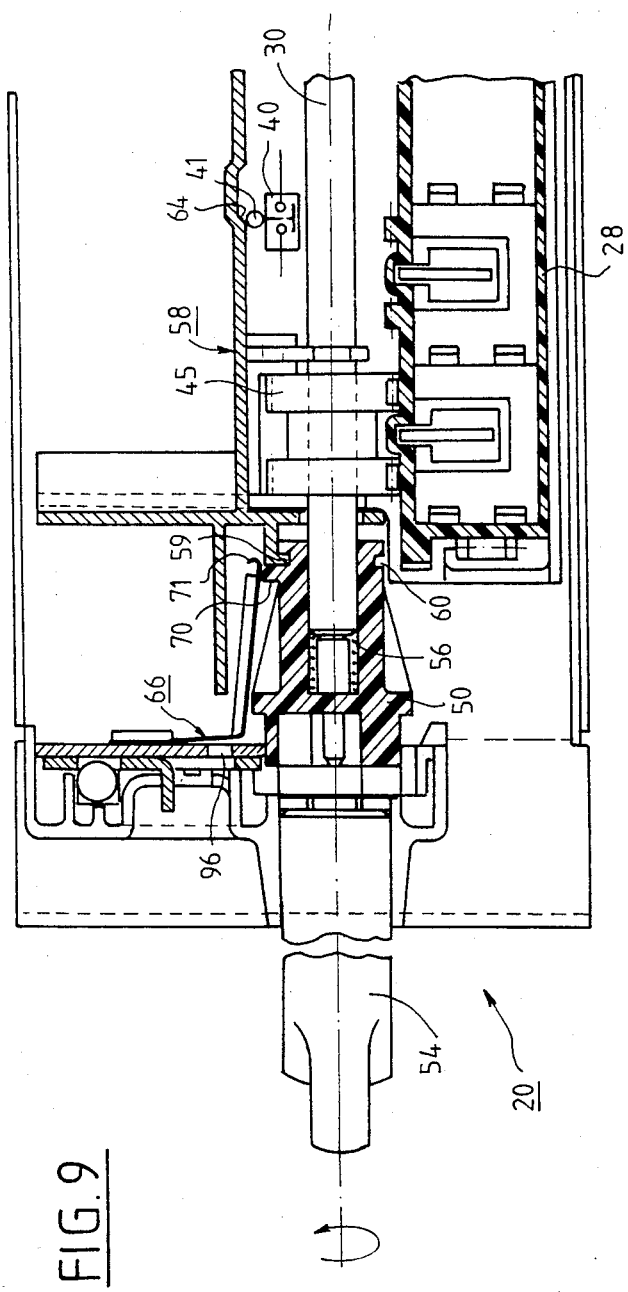
Figure 10:
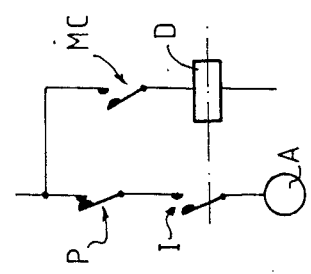

FIG. 7 shows the initial "engaged" position of block 20 in which the plug 50 and the transmission piece 58 are each in a rest position and are interlocked with each other by engagement of spur 59 in groove 60; the cam 70 cooperates with the blade spring 66. In this position, the two pre-break microcontacts, only one of which is shown schematically at 40 in FIG. 7, are at rest, for example in the closed state. FIG. 8 shows, in the form of contacts, the electric diagram corresponding to this engaged position: contacts P (clips-omnibus bars connection), MC (pre-break microcontact) and I (contact of the switch apparatus) are all closed; in this FIG. 8, at D has been shown the tripping means of the switch apparatus and at A anyone actuator fed from the omnibus bars.

The operator inserts the key 54 controlling the disconnection in the mating housing 52 of plug 50, this insertion only being possible through the notch referenced by the indication "1"(FIG. 6), then exerts an axial thrust on the key which causes a rearward movement with respect to shaft 30 of the plug 50 - transmission piece 58 assembly. During this movement, FIG. 9, the finger 41 of each microcontact 40 is driven by the associated ramp 64, thus actuating the pre-break microcontacts which open (FIG. 10) and which cause tripping of the switch apparatus via the tripping means D (FIG. 10); the power circuit is then switched off before disconnection.

Maintaining the pressure force exerted by the key (microcontacts open) and by rotating this key through three quarters of a revolution, the operator then causes rotation of shaft 30 and the movement of the clip carrying slide 28, spur 59 bearing slidingly in the annular groove 60 of the plug. At the end of rotation of the key, as can be seen in FIG. 11, the cam of plug 50 has retracted so as to allow spring 66 to come into abutment against the spur 59 of the transmission piece, whereas the ramp 75 takes up a position opposite said spur; furthermore, in the disconnecting position (contact P open, FIG. 12), the notch 86 formed in plug 50 is situated, seen in section in FIG. 11, on the same side as the flap 82 carried by the plate 68.

When disconnection by rotation through three quarters of a revolution of operating key 54 is finished, the operator may then withdraw the key through the coinciding notch referenced by the indication "0" (FIG. 6), which causes return of the plug 50 alone, this latter being separated from the transmission piece 58 by the spur 59 passing over the ramp 75, as shown in FIG. 13; the transmission piece 58 is retained in abutment against spring 66, so that the pre-break microcontacts (MC, FIG. 14) remain open.

Figure 15:
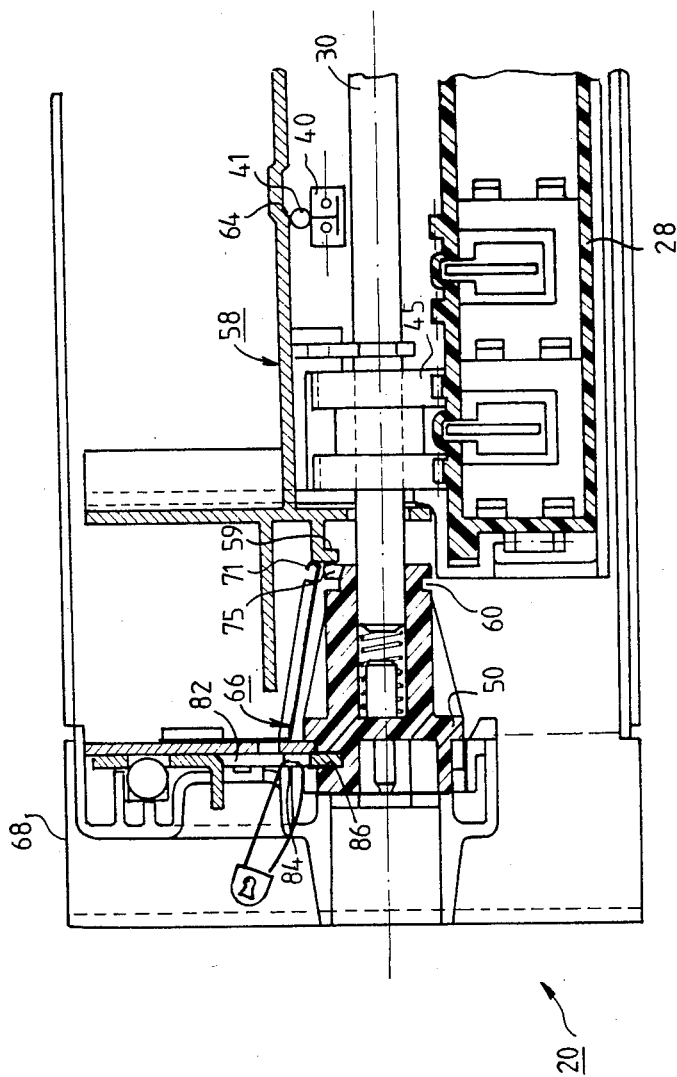
FIG. 15 is a view similar to FIG. 13, with padlocking of the device in the disconnected position.
Figure 16:
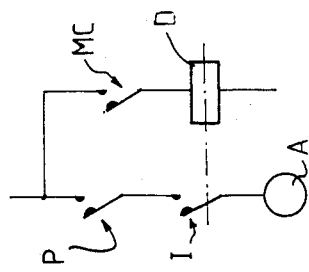
FIG. 16 is a view similar to FIG. 14, for the disconnected and padlocked position of the device of FIG. 15.

Through return of the plug 50, the notch 86 thereof comes opposite the flap 82, seen in section in FIG. 13, so that the operator may then cause the flap to slide laterally in the notch so as to immobilize the plug and free the aperture 84 (FIG. 6); the operator may then lock the block by padlocking, as shown in FIG. 15; FIG. 16 (open contacts) shows the diagram corresponding to the "disconnected-padlocked" position.

Furthermore, from the disconnected position such as illustrated in FIG. 13, the operator may test the switch apparatus and check electrically auxiliaries thereof; such off load checking is carried out in the following way, with reference to FIGS. 17 to 22.

Figure 17:
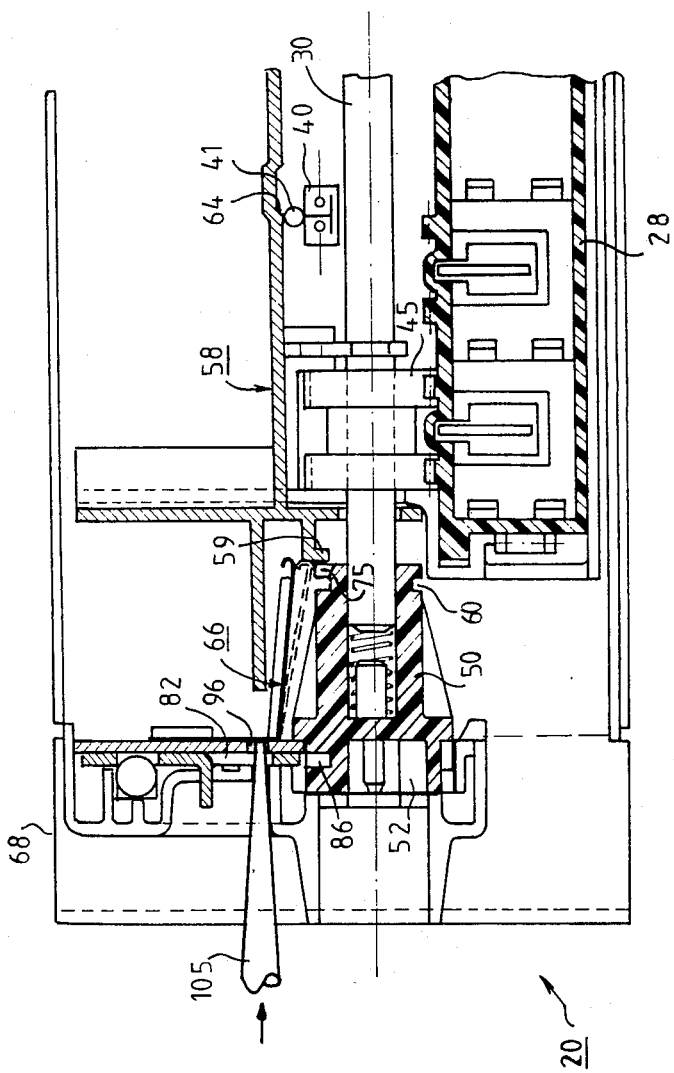
FIGS. 17, 19 and 21 show a partial sectional view through line V—V of FIG. 3, respectively for the different steps of an off load test of the switch apparatus made in the disconnected position.
Figure 18:
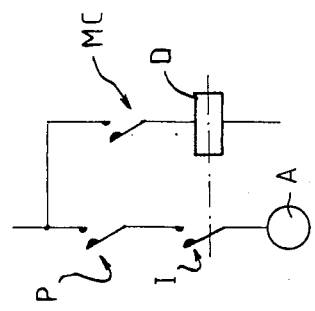
FIGS. 18, 20 and 22 show a simplified diagram in the form of electric contacts whose respective illustrated states correspond respectively to the different steps of the off load test according to the preceding Figures.

The operator inserts a tool 105, FIG. 17, through the orifice 96 formed in the plate 68 so as to free the spring 66 from its position in abutment against the spur 59 of the transmission piece; spring 66 then passes from its position illustrated with broken lines in FIG. 17 to that shown with a thick continuous line under the action of the tool, FIG. 18 showing the diagram corresponding to the "disconnected" position (contacts open).

Figure 19:
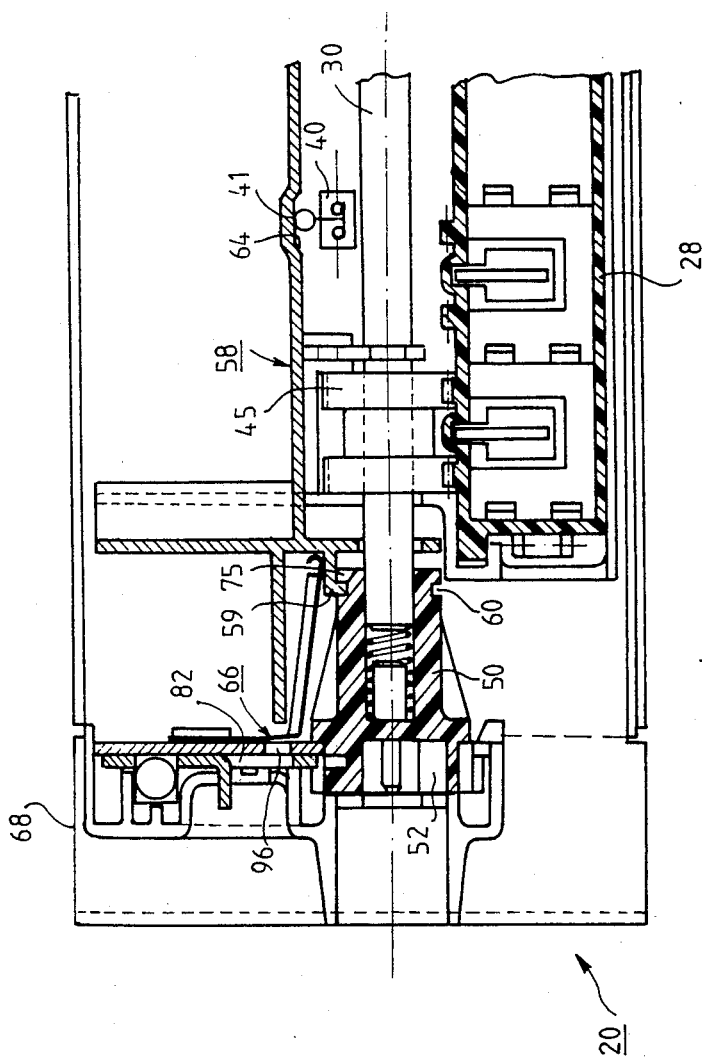
Figure 20:
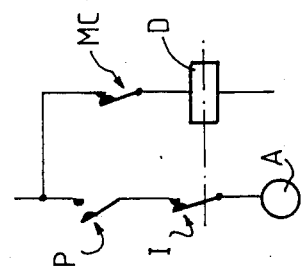

Retraction of spring 66 then causes the transmission piece 58 to be returned under the action of its spring (61, FIG. 3), the spur 59 of piece 58 engaging in the annular groove 60 of the plug via the ramp 75, as illustrated in FIG. 19. During this return, the pre-break microcontacts 40 leave their respective associated ramps 64 and therefore come back to their rest, that is to say closed, state (FIG. 20).

Figure 21:
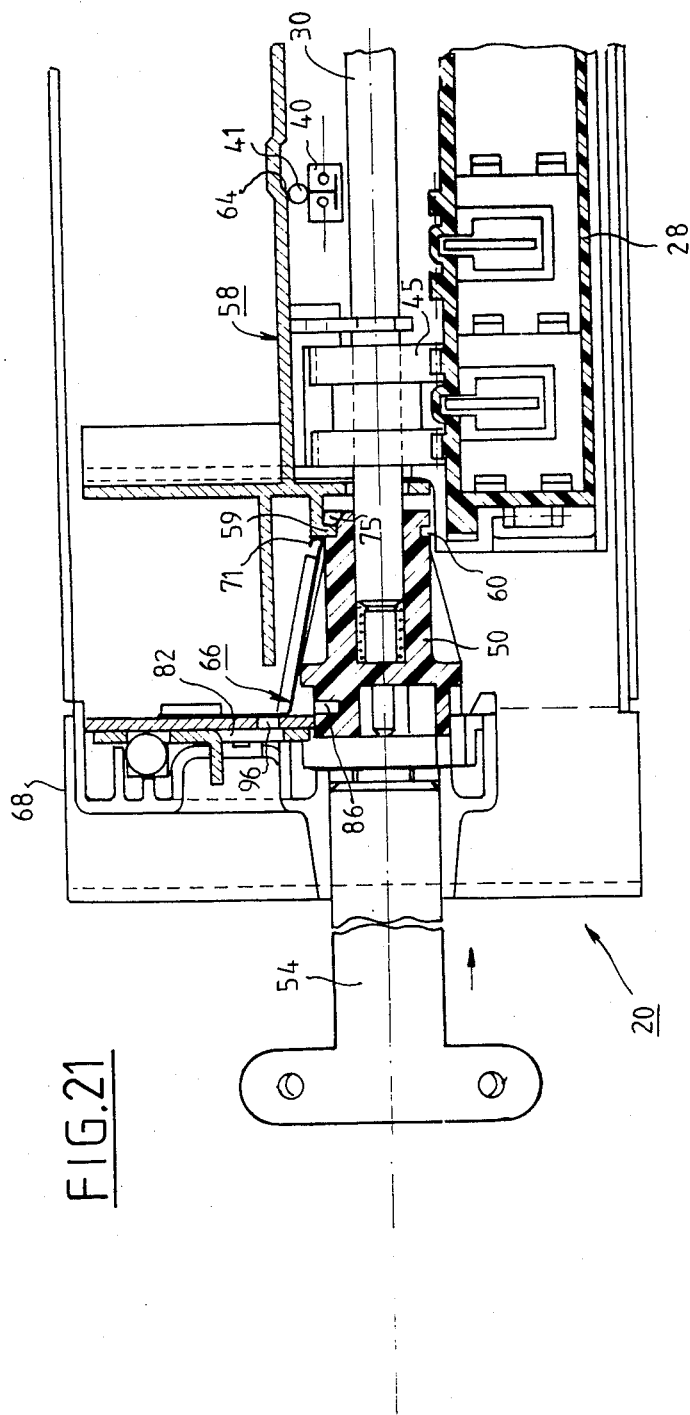
Figure 22:
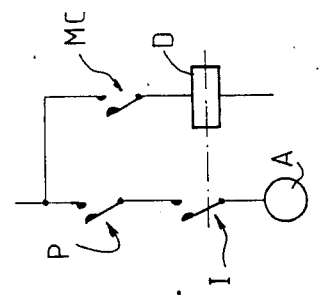

At the end of testing, the operator brings block 20 back to its "disconnected" position simply by inserting the key 54 into the housing 52 of plug 50 and exerting an axial thrust so as to move the plug-transmission piece assembly rearwardly with respect to the shaft, as illustrated in FIG. 21; the blade spring 66 therefore takes up again its position in abutment against piece 58, whereas the microcontacts 40 are again actuated by driving the associated ramps 64 and open (FIG. 22); the operator then removes the key in the same way as described with reference to FIG. 13.

When, after disconnection, the operator wishes to re-engage the clips on the omnibus bars, he acts in a way which is reciprocal to the one described above, namely:

insertion of the key and axial thrust so as to engage the spur of the transmission piece in the annular groove of the plug via the ramp (microcontacts open), rotation through three quarters of a revolution of the key so as to cause rotation of the shaft and movement of the slide in the direction of the bars, the clips engaging on the bars at the end of travel;

retraction of the blade spring is ensured by the cam, removal of the key which causes the return of the plug-transmission piece assembly; during this return, the microcontacts leave their associated ramps and then come back to their rest, that is to say closed position.

Of course, the invention is in no wise limited to the embodiment described and shown and includes all the technical equivalents of the means described, as well as combinations thereof if they are effected in the spirit of the invention and used within the scope of the following claims.

What is claimed is:

1. In a current tapping device disconnectable from a distribution column with parallel non coplanar omnibus bars, having:
    a fixed part with means for electric connection to at least one switch apparatus, as well as at least one pre-break microcontact which is actuated by control means, said or each switch apparatus occupying a tripped position in response to the actuation of the or each microcontact;
    a part movable in translation including a slide which carries clips engageable on the bars and disengageable therefrom, the translational movement of the slide being produced so as to provide current tapping and respectively disconnection;
    means controlling the disconnection including a rotary shaft whose rotation controls the translational movement of the slide through a movement transformation member, and a rotary plug driving the shaft which is mounted for translation on the shaft while being urged by a return spring, the plug being actuated by a control member;
    said means controlling the pre-break include a transmission piece movable in translation while being urged by another return spring and having at least one ramp driving a member actuating the respective microcontact, the transmission piece occupying, in the engaged position, a first rest position in which said or each switch apparatus is engaged and said transmission piece also includes a spur in the form of a hook engageable, for the engaged position, in an annular groove formed in the external periphery of the plug at one of its ends so as to allow, in this engaged position, the translational movement both of the plug along the axis of the shaft under the action of a pressure force exerted thereon by the control member and of the transmission piece from its rest position whose ramp or ramps, during this movement, urge the member actuating the respective microcontact so as to cause tripping of the respective switch apparatus, the control of the disconnection by rotation of the shaft taking place at the end of the movement of the plug-transmission piece assembly and by maintaining the pressure force, the spur being in sliding abutment in the groove of the plug during control of the disconnection.

2. The device as claimed in claim 1, wherein said transmission piece has a general shape substantially in the form of an L one of the branches of which extends in a direction substantially parallel to the axis of the shaft and has, substantially over the whole of its length, a vertical wall in which is formed the or each driving ramp, and whose other leg is arranged in the vicinity of the plug and supports at right angles the hook shaped spur intended to be engaged in the groove of the plug during control of the pre-break and during control of the disconnection.

3. The device as claimed in claim 1, wherein flexible retractable means are provided for retaining, solely in the disconnected position, the transmission piece in a second position which it occupies after its translational movement, and the groove of the plug is provided with a disengagement ramp oriented outwardly and coming opposite the spur of the transmission piece solely for the disconnection position so as to allow movement, in this position, in the reverse direction of the plug alone along the axis of the shaft under the action of its spring after release of the pressure force.

4. The device as claimed in claim 3, wherein said plug is provided with a cam and said flexible retractable means retaining the transmission piece are formed by a blade spring one of the ends of which is provided fixed and the other end of which forms a stop for cooperating with the spur of the transmission piece solely in the disconnection position, the spring cooperating with the cam of the plug during control of the pre-break so as to ensure retraction thereof and being disengaged from the cam during control of the disconnection so that, in the disconnection position, its stop retains the transmission piece in its second position.

5. The device as claimed in claim 1, wherein the fixed part includes a plate which is mounted facing the plug and which extends in a direction perpendicular to the axis of the rotary shaft, the plate has on its rear face a vertical flap lockable in the engaged position in which it closes an aperture formed in the plate, and a notch is provided on the surface of the plug and is situated so as to come opposite the flap solely in the disconnection position, so that in this position, the flap is able to engage by translation in the notch under the action of a manual control piece, this latter moving the flap inside the notch so that at the end of travel said flap comes into abutment against the bottom of the notch for immobilizing the plug, and leaves the aperture uncovered for insertion of at least one padlock.

6. The device as claimed in claim 5, wherein the manual control piece actuating the flap is formed by a pull-tab which is formed integrally with the flap and which extends in a direction perpendicular to the direction of movement of the flap while projecting from an opening formed in the plate.

7. The device as claimed in claim 5, wherein said rotary plug has at its other end a housing with asymmetric contour, and the plate has a projection forming an annular collar coaxial with the plug and comprising two insertion notches disposed respectively along two perpendicular axes, the housing in the plug and one or other of the notches of the collar being able to receive the control member and coinciding only in the engagement position and respectively in the disconnection position.

8. The device as claimed in claim 7, wherein said control member is an operating key which is provided with a spur able to be engaged in one or other of the notches of the collar for the respective engagement and disconnection positions, and said spur is able to cooperate with a bearing surface provided on the collar so as to prevent removal of the key during disconnection and re-engagement.

9. The device as claimed in claim 4, wherein the plate is provided with an access orifice for passing therethrough a tool intended to actuate the blade spring retaining the transmission piece, said tool being inserted solely in the disconnection position so as to allow the blade spring to retract in this position, the transmission piece undergoing a displacement under the action of its return spring so as to occupy its rest position in which the respective switch apparatus is engaged, allowing an off load test of said or each switch apparatus.

10. The device as claimed in claim 5, wherein said rotary shaft extends in a direction perpendicular to the direction of movement of the slide, and the plate also has a window displaying the disconnection state by being placed so that in the disconnected position, the ends of the clips carried by the slide appear in the window.

11. The device as claimed in claim 1, wherein the fixed part has an additional microcontact connected to an indicator light and actuated by a control element, and the slide is provided with a cam which cooperates with the control element in the disconnected position so as to cause the indicator light to light up in this position in response to the actuation of the microcontact, thus indicating the disconnected state.

* * * * *